United States Patent [19]

Clarke

[11] Patent Number: 4,557,400

[45] Date of Patent: Dec. 10, 1985

[54] CONVERTIBLE CARGO CARRIER FOR TRAILERS AND THE LIKE

[75] Inventor: Edwin E. Clarke, Allentown, Pa.

[73] Assignee: Converta-Vans, Inc., Allentown, Pa.

[21] Appl. No.: 454,881

[22] Filed: Dec. 30, 1982

[51] Int. Cl.$^4$ .......................... B60P 1/56; B61D 3/06; B61D 7/32; B61D 17/18

[52] U.S. Cl. .................................. 222/105; 105/243; 105/422; 105/423; 220/1.5; 220/334; 220/461; 296/181; 298/24

[58] Field of Search .............. 105/239, 243, 358, 360, 105/423, 422; 222/105, 183, 630; 298/1, 24, 34, 27, 29; 220/1.5, 334, 461; 296/181

[56] References Cited

U.S. PATENT DOCUMENTS

| | | | |
|---|---|---|---|
| 886,472 | 5/1908 | Brown | 105/243 |
| 952,169 | 3/1910 | Young | 298/29 |
| 983,666 | 2/1911 | Young | 298/29 |
| 2,821,433 | 1/1958 | Hamlet | 298/7 |
| 3,583,330 | 6/1971 | Freudman | 105/239 |
| 3,756,469 | 9/1973 | Clarke et al. | 105/243 X |
| 3,901,552 | 8/1975 | Stone | 298/24 |
| 4,092,051 | 5/1978 | D'Orazio | 222/105 X |
| 4,155,469 | 5/1979 | Cole | 222/105 X |

Primary Examiner—Robert B. Reeves
Assistant Examiner—David F. Hubbuch
Attorney, Agent, or Firm—Lalos, Leeds, Keegan, Marsh, Bentzen & Kaye

[57] ABSTRACT

A carrier unit adapted to be converted into a bulk material carrier including a container having a floor and two parallel substantially vertical walls. The floor has at least one floor panel movable between a storage position and an operative position and at least one floor section movable between a storage position and an operative position. The floor panel when in the operative position and the floor sections when in the operative position cooperate with portions of the walls to define a compartment and to form an opening in the floor, which communicates with hoppers depending from the floor. A flexible liner is mountable in the compartment, when the floor panel and the floor sections are in the operative positions, for holding bulk material. The flexible liner includes an inlet for charging bulk materials into the liner compartment and an outlet cooperable with the opening for communicating the interior of the liner compartment with the exterior of the compartment for discharging the bulk materials. The floor panel and floor sections when in the storage position form a floor on which general cargo may be stored.

38 Claims, 9 Drawing Figures

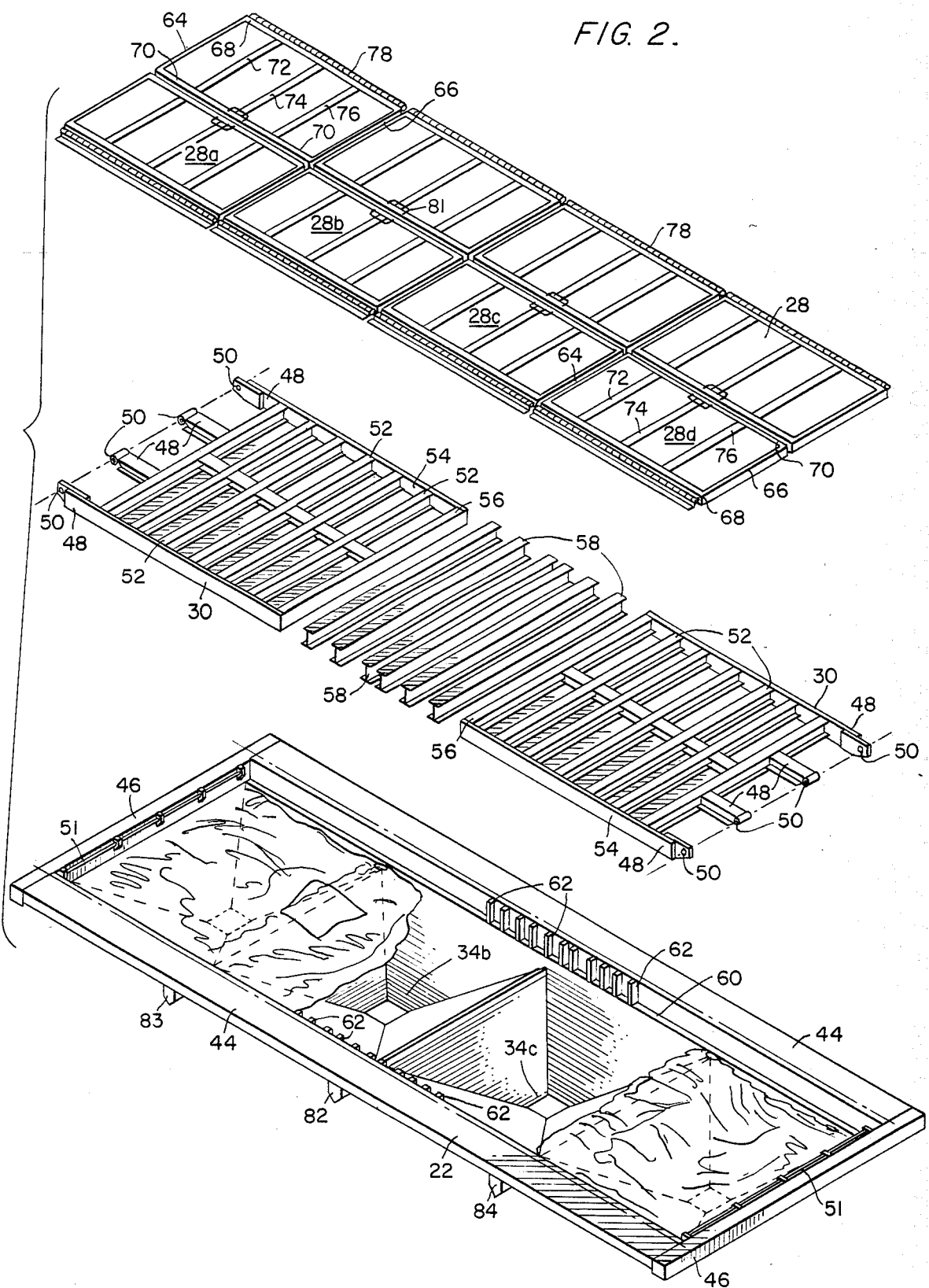

/ 1

CONVERTIBLE CARGO CARRIER FOR TRAILERS AND THE LIKE

FIELD OF THE INVENTION

This invention relates to a carrier unit and more particularly to a carrier unit for trailers and the like which is normally adapted to carry general cargo but which can be converted into a bulk material carrier.

BACKGROUND OF THE INVENTION

Although recent efforts have been successful to an extent in devising carrier units which can be adapted to carry either general cargo or bulk materials, problems have arisen. Such convertible carrier units in the prior art it has been found, have not been entirely satisfactory in fully utilizing the available space, reducing the cost of manufacture, and providing a unit which can easily and quickly be converted between a general cargo carrier and a bulk material carrier.

OBJECTS OF THE INVENTION

Accordingly, it is the principal object of the present invention to provide a novel and improved carrier unit which is adapted to carry general cargo or to carry bulk materials.

Another object of the present invention is to provide an improved carrier unit normally adapted to carry general cargo which is convertible into a bulk material carrier.

A further object of the present invention is to provide an improved carrier unit which can be quickly and simply converted between a general cargo carrying mode and a bulk material carrying mode.

A still further object of the present invention is to provide an improved convertible carrier unit which when in its bulk material carrying mode can efficiently and completely load and unload the bulk material by gravity feed means.

Another object of the present invention is to provide an improved convertible carrier unit which when in its bulk material carrying mode includes a liner which extends to the lower most portions of the outlet hoppers.

A further object of the present invention is to provide an improved convertible carrier unit adapted to carry general cargo, bulk material or a combination of general cargo and bulk material which is simple in design, comparatively inexpensive to manufacture, and easy to convert for carrying different forms of cargo.

A still further object of the present invention is to provide an improved convertible carrier unit which maximizes the amount of storage space when in its general cargo carrying mode.

Another object of the present invention is to provide a novel convertible carrier unit in which a portion of the floor when in the general cargo carrying mode defines at least one end wall when in the bulk material carrying mode.

A further object of the present invention is to provide a novel carrier unit having an improved liner and means for mounting the liner to convert the unit to a bulk material carrying mode.

Other objects and advantages of the present invention will become more apparent to those persons having ordinary skill in the art to which the present invention pertains from the following description taken in conjunction with the accompanying drawings.

THE DRAWINGS

FIG. 2 is an exploded view of the floor portion of the embodiment of FIG. 1.

DESCRIPTION OF THE PREFERRED EMBODIMENT

Figure 1:
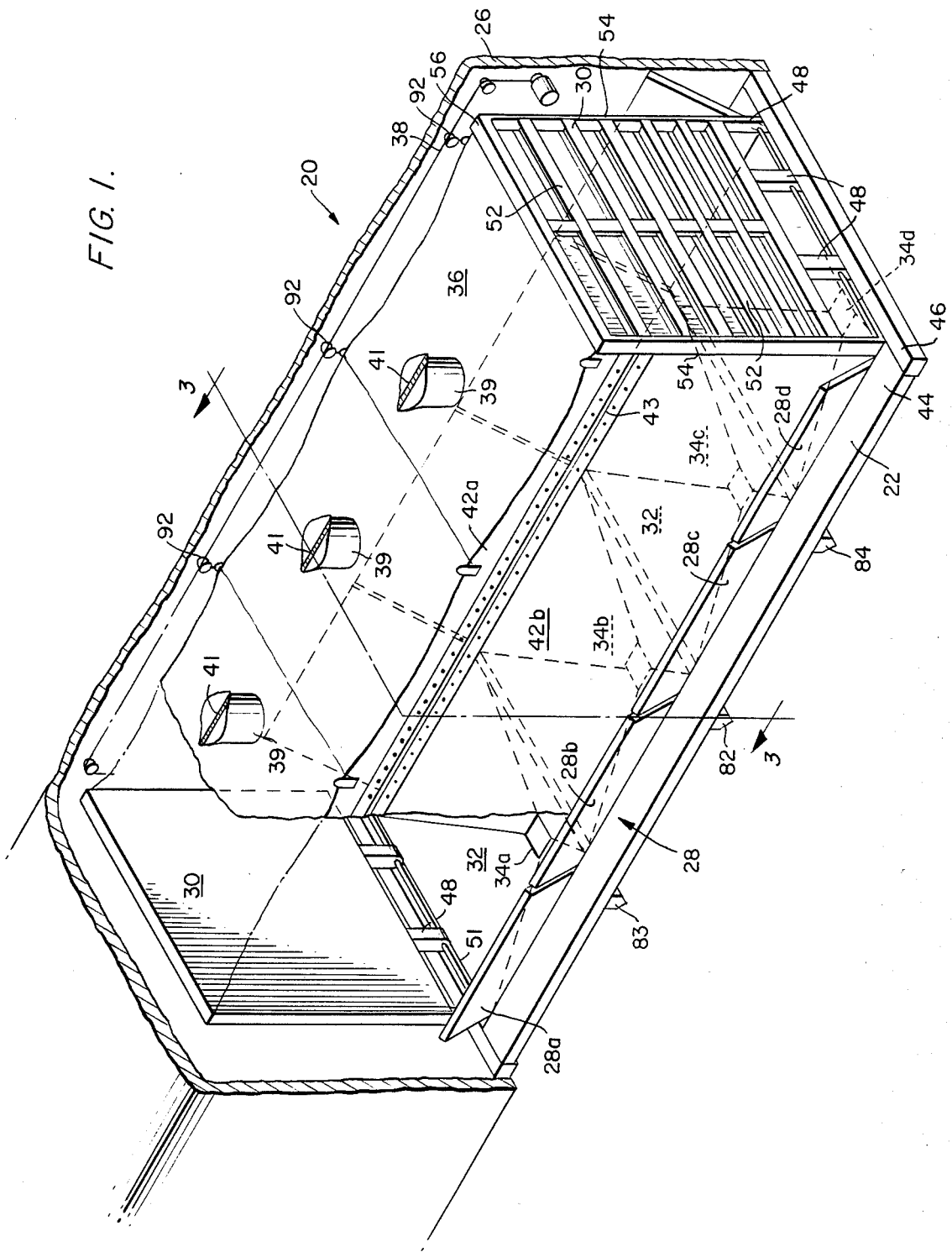
FIG. 1 is a perspective view of the preferred embodiment of the invention having portions thereof broken away.
Figure 4:
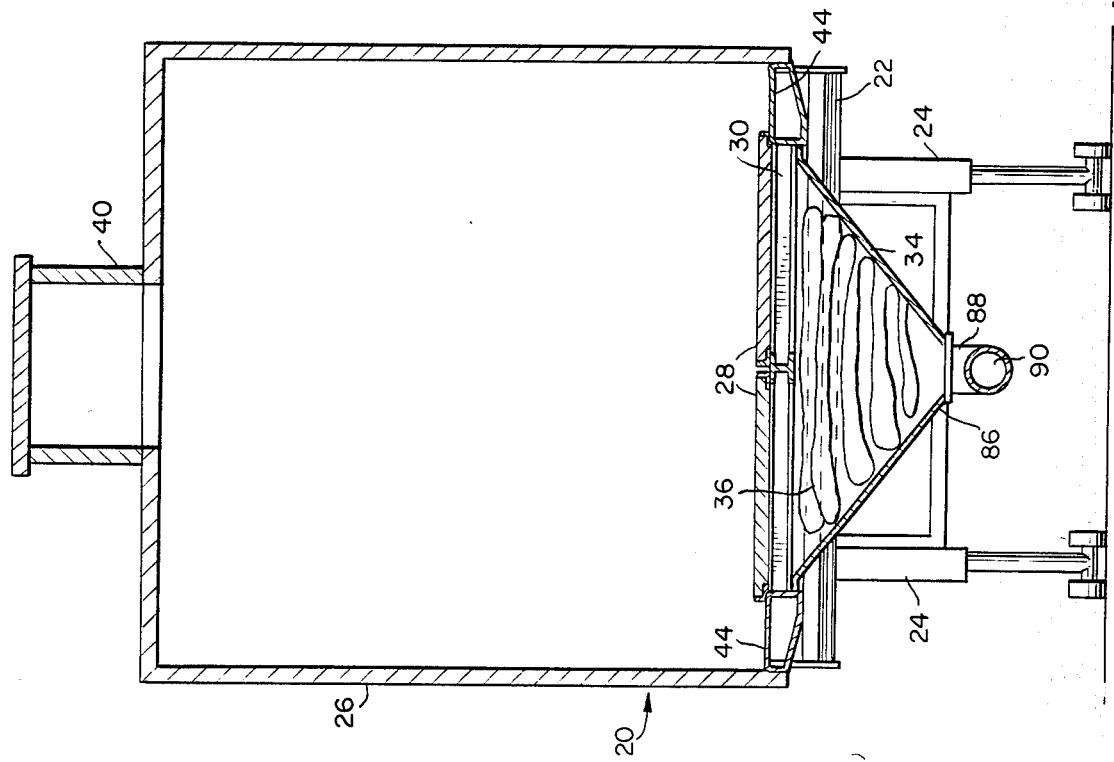
FIG. 4 is a view similar to the view of FIG. 3 illustrating the carrier unit in its general cargo carrying mode.
Figure 3:
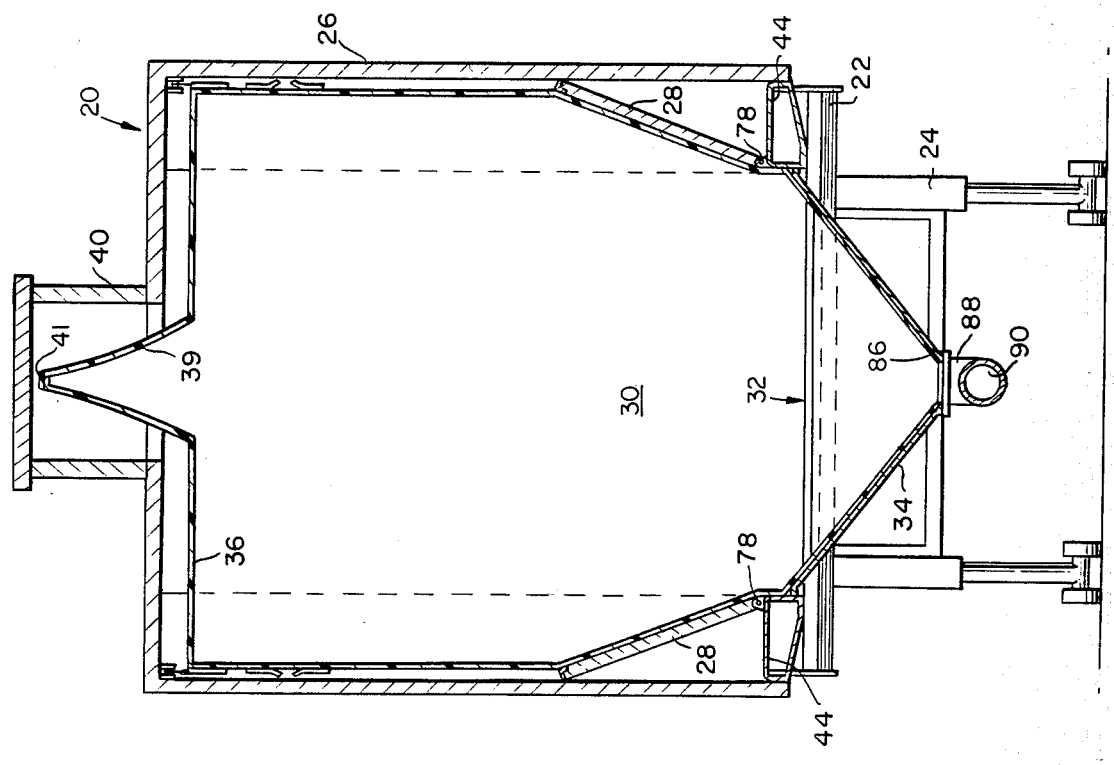
FIG. 3 is an enlarged cross-sectional view taken along line 3—3 of FIG. 1, illustrating the carrier unit in its bulk material carrying mode.

Referring to FIG. 1, an embodiment of the present invention shown generally at 20 is illustrated. It generally comprises a chassis 22 mounted on support legs 24, which are best shown in FIGS. 3 and 4, opposed parallel walls 26 mounted to opposite sides of chassis 22, floor panels 28 hingedly connected to chassis 22, and opposed floor sections 30 also hingedly connected to chassis 22. When floor sections 30 and floor panels 28 are in their open, elevated operative positions the interior of the carrier unit communicates through opening 32 with four hoppers 34a, 34b, 34c, and 34d connected to and depending from chassis 22, and the floor sections are either vertical or sloping towards opening 32. When in the operative position a flexible liner shown at 36 is installed by pulling on cord 38 attached to wall 26 outside of floor section 30 when in the operative position. Flexible liner 36 includes a plurality of longitudinally spaced flexible conduit sections 39 which are registrable with and adapted to extend into the annular loading conduits 40 of the top wall of the chassis when the liner is in its operative position. Each of the conduit sections is provided with an opening in the upper end thereof which may be closed with an interlocking fastener or zipper 41. Flexible liner 36, for ease of installation, can comprise an upper portion 42a operatively connected to cord 38, a larger lower portion 42b, and a snap, grommet or similar connection means shown generally at 43 connecting portions 42a and 42b, best shown in FIG. 1.

Figure 7:
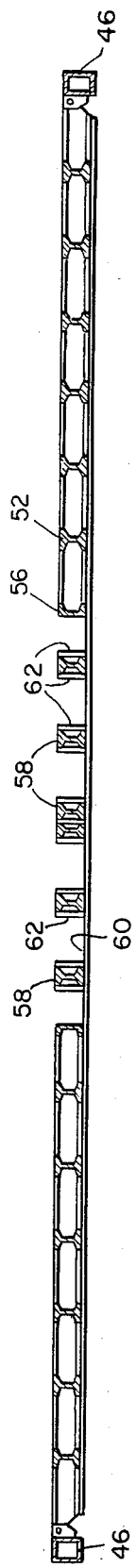
FIG. 7 is a side view of FIG. 6.

Referring to FIG. 2, the structural interrelationship between the chassis 22, the floor sections 30 and the floor panels 28 is best illustrated. It is seen therein that chassis 22 includes a pair of longitudinally disposed box-like structural members 44 (these are best shown in FIGS. 3 and 4) and a pair of opposed box-like structural members 46 (which are best shown in cross-section in FIG. 7) at opposite ends thereof. Each of the floor sections includes four legs 48 extending therefrom and each of these legs has an opening 50 registering with the openings in the other parallel legs. A rod 51 passes through openings 50 and thereby a pivotal connection is created between the floor section 30 and the chassis 22. A similar rod pivoting assembly is provided for the opposing floor section.

Figure 6:
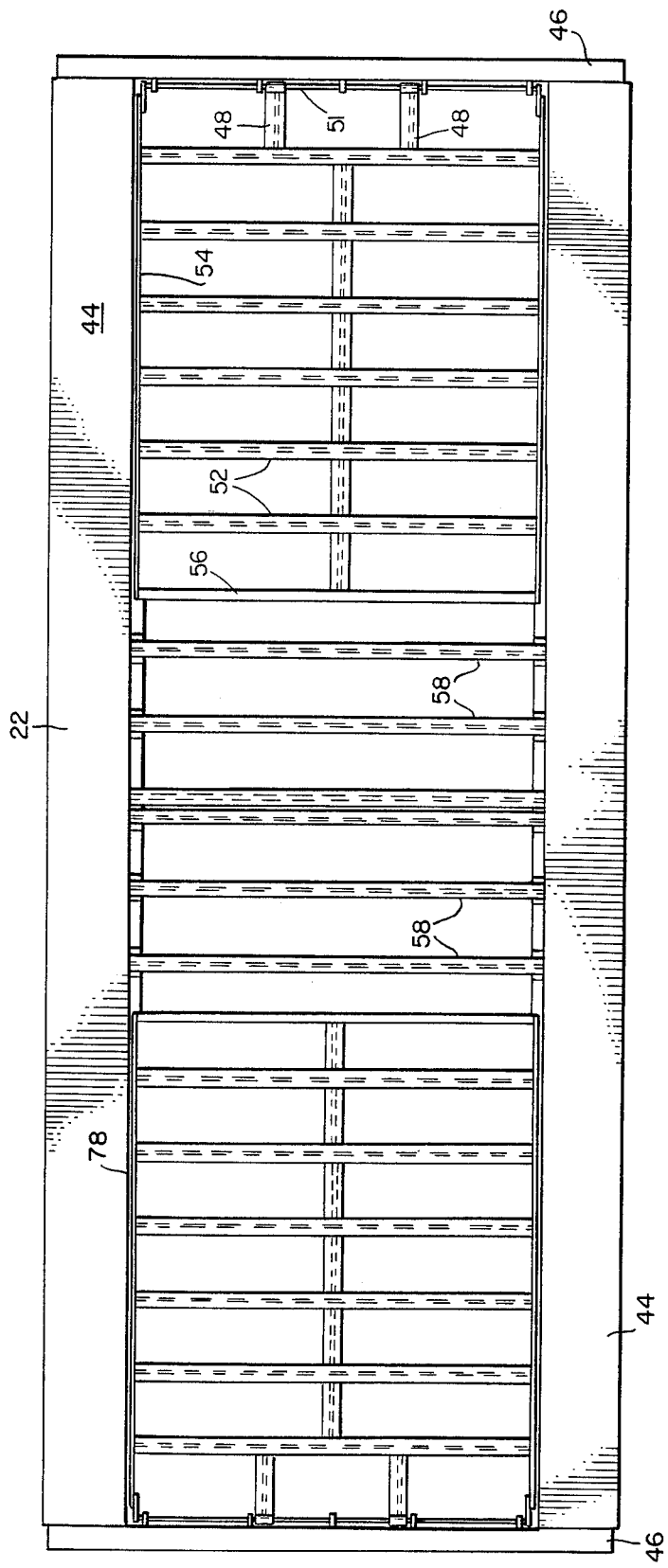
FIG. 6 is a top plan view similar to that of FIG. 5 wherein the floor panels have been placed in their operative position.

The floor sections further include a plurality of longitudinally spaced structural members 52 attached to and extending between outer lateral members 54. Members 52 provide structural support for the floor when the floor sections are in the down or storage positions as shown in FIG. 2. Floor sections 30 have end members 56 which when in the down or storage position are spaced. To provide the structural support for the space between these end members a plurality of structural I-beams 58 are provided. These structural beams are adapted to rest on surface 60 of chassis 22, as are the floor sections. They also are held in place by spacer struts 62 which provide a slot into which each beam 58 can be positioned. When the floor sections 20 are in their up or operative positions the beams 58 are lifted out from between member 62 and placed in a storage location, thus, leaving the entire opening 32 open. When the carrier unit is to be placed in its cargo storage mode the beams 58 are simply taken from their storage location and placed in their respective slots defined by struts 62. Floor sections 30 and beams 58 are best illustrated in their cargo storage position in FIGS. 6 and 7.

Figure 5:
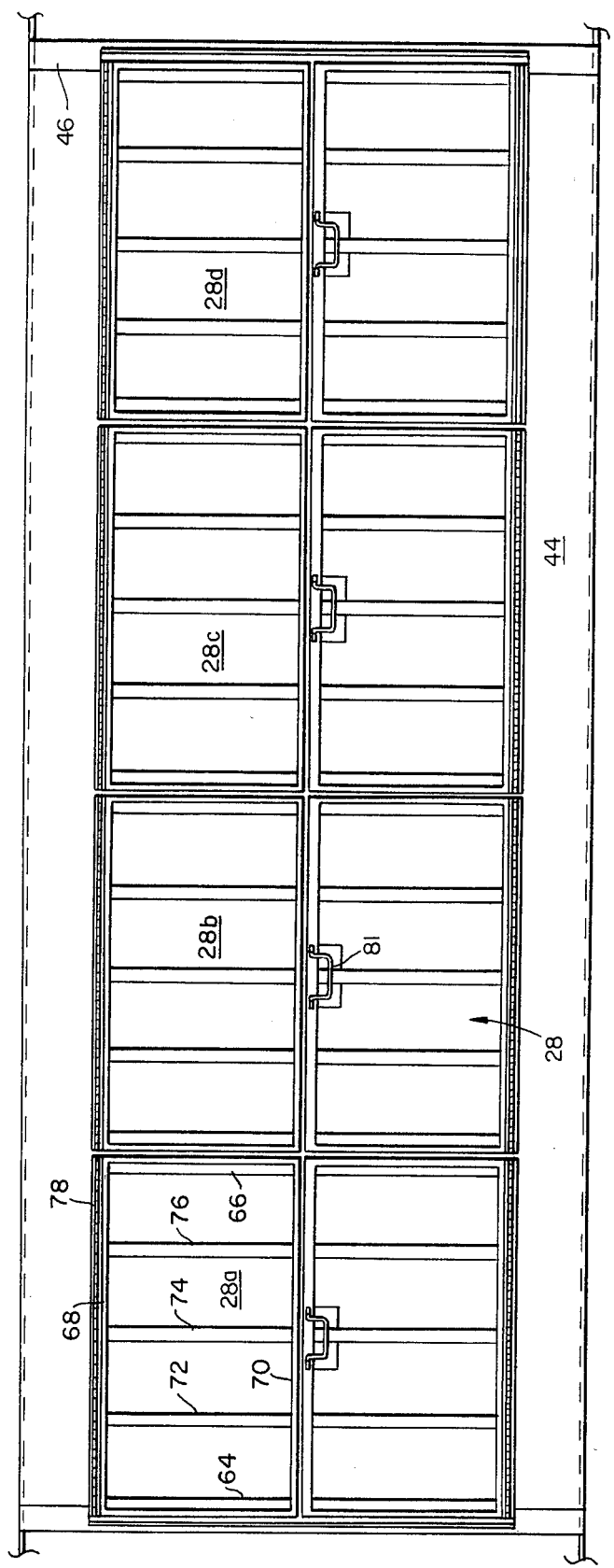
FIG. 5 is a top plan view of the floor section illustrated in FIG. 2 when in its assembled or storage position.

Floor panels 28 when in their cargo storage position are best shown in FIG. 5 as well as in the upper portion of FIG. 2. Referring thereto, it is seen that there are four pairs of opposed panels 28a, 28b, 28c, and 28d. Each of the eight panels has generally identical construction and includes a pair of longitudinally positioned members 64 and 66 which extend between parallel members 68 and 70 whereby a rectangular frame structure is defined. Extending between members 68 and 70 are support struts 72, 74 and 76. A hinge 78 is attached along one edge to member 68 and along the other edge to box-like structure 44 of chassis 22. Hinge 78 allows the floor panels to be pivotally moved between their cargo storage or down position as shown in FIG. 5 or 2 in their up or operative or bulk material storage position as shown in FIG. 1 wherein member 70 rests against the wall of 36 and the surface 80 of the floor panels is slanted toward opening 32. A handle 81 is attached along member 70 for each of the panels so that each of the panels can be lifted to its operative positions with relative ease. The floor panels when in their down or storage position define a generally flat cargo support surface as shown in FIG. 4.

Figure 8:
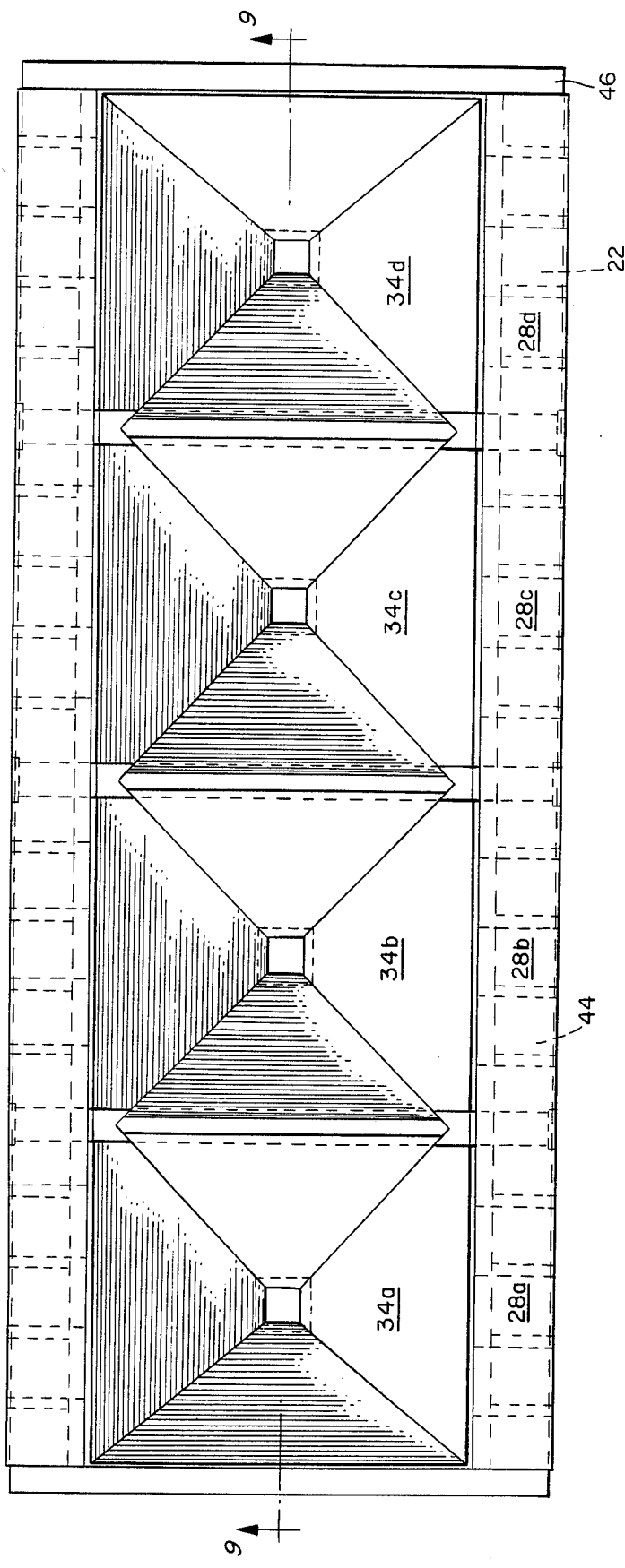
FIG. 8 is a top plan view of the floor of FIG. 2 wherein the floor panels and floor sections are in their operative or bulk material carrying positions, and shows the hoppers in a top plan view.
Figure 9:
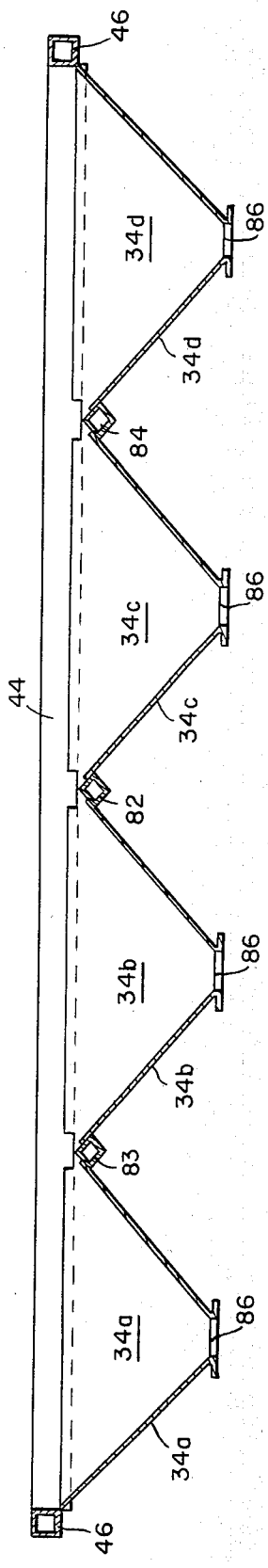
FIG. 9 is a cross-sectional view taken along line 9—9 in FIG. 8.

When the floor sections and floor panels are in their up or operative positions the interior of the carrier unit communicates with opening 32 which in turn communicates with cargo hoppers 34. As best shown in FIGS. 8 and 9, four such cargo hoppers are provided and each defines a generally cone-shaped structure and is attached to and depends from one or more of the longitudinally or laterally extending box-shaped beams 82, 83 or 84. Along the lower surfaces 86 of each of the hoppers is attached a gate, butterfly or similar valve 88 which opens so that the grain or other bulk material in the hopper can be gravity discharged through the lower surface 86 and into the conveying system 90. When valve 88 is in the closed position the bulk material may be loaded and stored in the hoppers and in the container area defined by the liner. The liner, as best shown in FIG. 3 and FIG. 1, is attached at the bottom to lower surface 86 and is suspended by wheels 92 which are connected to cord 38. As cord 38 is pulled wheels 92 move the liner between the floor sections. The entire liner or just lower portion 42b can be stored in one of the hoppers 34, as shown in FIG. 4, when the carrier unit is in its cargo carrying mode.

Thus, the carrier unit can be converted from a general cargo carrying load as shown in FIG. 4 to a bulk material carrying load as shown in FIG. 3 in a very simple and quick process. Generally, this is accomplished by lifting the handles on each of the eight floor panels so that they rest against the wall as shown in FIG. 1 and by lifting the floor sections so that they are in the generally vertical positions also shown in FIG. 1 and securing them in the upright position by straps, latches, or similar means (not shown). The liner is removed from the hopper and attached to wheels and the cord and then pulled by the cord so that it extends the length of the compartment. The conduit sections 39 are properly positioned and the end portions are attached at the surface 86 of each of the hoppers. The flexible liner then conforms to the shape of the compartment as defined by the walls, the ceiling, the generally vertical floor sections and the slanted floor panels as well as the hoppers. The carrier unit can be returned to its cargo carrying mode in a generally reverse procedure.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

I claim:

1. A cargo carrier unit adapted to be converted into a bulk material carrier comprising:

a container having a floor and two parallel substantially vertical walls, said floor including at least one floor panel movable between a storage position and an operative position elevated relative to said storage position and at least one floor section movable between a storage position and and an operative position elevated relative to said storage position, said floor panel when in said operative position and said floor section when in said operative position cooperating with portions of said walls to define a bulk compartment, said floor panel being positioned above said floor section when said floor panel and said floor section are in said storage positions, said floor panel when in said operative position and said floor section when in said operative position forming an opening in said floor, said floor panel when in said operative position providing a surface inclined toward said opening, each said floor section when in said operative position being generally adjacent said opening and perpendicular to said walls, and a flexible liner mountable in said bulk compartment when said floor panel and said floor section are in said operative positions, said flexible liner defining a liner compartment for holding bulk material when mounted in said bulk compartment, said flexible liner including an inlet means for charging bulk materials into said liner compartment and an outlet means cooperable with said opening for communicating the interior of said liner compartment with the exterior of said bulk compartment.

2. The carrier unit according to claim 1 including, each said floor section defining a surface sloped towards said opening when in said operative position.

3. The carrier unit according to claim 1 including, each said floor section defining a generally vertical surface when in said operative position.

4. The carrier unit according to claim 1 including, at least one hopper disposed in said opening and communicable with the exterior of said bulk compartment.

5. The carrier unit according to claim 4 including, said flexible liner extending into said hopper when said flexible liner is mounted in said bulk compartment.

6. The carrier unit according to claim 4 including, a gate attached at the lower end of said hopper and movable between a closed storage position and an open discharge position.

7. The carrier unit according to claim 6 including, a conveying system connectable to said gate for discharging bulk material from said hopper when said gate is in said open discharge position.

8. The carrier unit according to claim 1 including, said at least one floor panel comprising at least two pairs of opposed floor panels.

9. The carrier unit according to claim 8 including, said floor panels comprising four pair of opposed floor panels.

10. The carrier unit according to claim 1 including, a suspension means for suspending upper portions of said liner when said liner is mounted in said bulk compartment.

11. The carrier unit according to claim 10 including, said at least one floor section comprising two opposed floor sections, and said suspension means including a moving means for moving an end of said liner between said floor sections when in said operative position.

12. The carrier unit according to claim 10 including, said flexible liner including a first portion attached to said suspension means, a second portion positionable adjacent said first portion, and an attaching means for attaching said second portion to said first portion whereby said liner compartment is formed.

13. The carrier unit according to claim 1 including, said at least one floor section comprising two opposed floor sections.

14. The carrier unit according to claim 13 including, said at least one floor panel comprising eight floor panels.

15. The carrier according to claim 14 including, each said floor section including at least one horizontal member providing structural support for said floor and disposed perpendicular to said walls when said floor sections and said floor panels are in said storage positions.

16. The carrier unit according to claim 14 including, said floor panels and said floor sections when in said storage position forming a floor for transporting general cargo in said container.

17. The carrier unit according to claim 13 including, each said floor section including first and second ends generally perpendicular to said walls, said first ends providing a pivot axis for pivoting said floor sections between said storage and said operative positions.

18. The carrier unit according to claim 17 including, said second ends being spaced when said floor sections are in said storage positions, and at least one beam being disposed horizontally perpendicular to said walls and between said second ends when said floor sections are in said storage positions, said beam providing structural support for said floor.

19. The carrier unit according to claim 18 including, said beam being removable when said floor panels are in said operative positions.

20. The carrier unit according to claim 13 including, said floor panels being supported by said floor sections when said floor panels and said floor sections are in said storage positions.

21. The carrier unit according to claim 1 including, each said floor section including first and second ends generally perpendicular to said walls, and said first ends providing a pivot axis for pivoting said floor section between said storage and said operative positions.

22. The carrier unit according to claim 21 including, said second ends being spaced when said floor section are in said storage positions, and at least one beam being disposed horizontally and perpendicular to said walls and between said second ends when said floor sections are in said storage positions, said beam providing structural support for said floor.

23. The carrier unit according to claim 22 including, said beam being removable when said floor panels are in said operative positions.

24. The carrier unit according to claim 21 including, each said floor section including at least one horizontal member providing structural support for said floor and disposed perpendicular to said walls when said floor section and said floor panel are in said storage positions.

25. The carrier unit according to claim 21 including, said floor panel being supported by said floor section when said floor panel and said floor section are in said storage positions.

26. The carrier unit according to claim 21 including, said floor panel and said floor section when in said storage position forming a floor for transporting general cargo in said container.

27. The carrier according to claim 1 including, each said floor section including at least one horizontal member providing structural support for said floor and disposed perpendicular to said walls when said floor section and said floor panel are in said storage positions.

28. The carrier unit according to claim 27 including, said floor panel being supported by said floor section when said floor panel and said floor section are in said storage positions.

29. The carrier unit according to claim 27 including, said floor panel and said floor section when in said storage position forming a floor for transporting general cargo in said container.

30. The carrier unit according to claim 1 including, said floor panel and said floor section when in said storage position forming a floor for transporting general cargo in said container.

31. The carrier unit according to claim 1 including, each said floor section providing about a transverse axis between said operative and storage positions, and each said floor section when in said operative position defining a transverse bulk material carrier end wall, and when in said storage position being positioned over said opening.

32. The carrier unit according to claim 31 including, said transverse bulk material carrier end wall extending generally to the top of said vertical walls.

33. The carrier unit according to claim 1 including, said floor panel when in said elevated operative position having its top edge resting against one said vertical wall.

34. A cargo carrier unit adapted to be converted into a bulk material carrier comprising:
a container having a floor and two parallel substantially vertical walls,
said floor including four pairs of opposed floor panels movable between a storage position and an operative position and two opposed floor sections movable between a storage position and an operative position,
said floor panels when in said operative position and said floor sections when in said operative position cooperating with portions of said walls to define a bulk compartment,
a flexible liner mountable in said compartment when said floor panels and said floor sections are in said operative position,
said flexible liner defining a liner compartment for holding bulk material when mounted in said bulk compartment,
said flexible liner including an inlet means for charging bulk materials into said liner compartment and an outlet means cooperable with said opening for communicating the interior of said liner compartment with the exterior of said compartment,
a suspension means for suspending upper portions of said liner when said liner is mounted in said compartment,
said suspension means including a moving means for moving an end of said liner between said floor sections when said floor sections are in said operative position,
at least one hopper disposed in said opening and communicable with the exterior of said compartment,
each said floor section including first and second ends generally perpendicular to said walls, said first ends providing a pivot axis for pivoting said floor sections between said storage and said operative positions,
said second ends being spaced from one another when said floor sections are in said storage positions,
at least one beam disposed horizontally and perpendicular to said walls and between said second ends when said floor sections are in said storage positions,
said beam providing structural support for said floor,
each said floor section including at least one horizontal member providing structural support for said floor and disposed perpendicular to said walls when said floor sections and said floor panels are in said storage positions,
said floor panels when in said operative position and said floor sections when in said operative position forming an opening in said floor,
each said floor panel when in said operative position providing a surface inclined toward said opening,
each said floor section when in said operative position being generally adjacent said opening and perpendicular to said walls,
said floor panels being positioned above and supported by said floor sections when said floor panels and said floor sections are in said storage positions, and
said floor panels and said floor sections when in said storage position forming a floor for transporting general cargo in said container.

35. A cargo carrier unit adapted to be converted into a bulk material container comprising:
a container having a floor and two parallel substantially vertical walls,
said floor including at least one floor panel movable between a storage position and an operative position elevated relative to storage position and at least one floor section movable between a storage position and an operative position elevated relative to said storage position,
said floor panel when in said operative position and said floor section when in said operative position cooperating with portions of said walls to define a bulk compartment,
said floor panel when in said operative position and said floor section when in said operative position forming an opening in said floor,
said floor panel when in said operative position providing a surface inclined toward said opening,
each said floor section when in said operative position being generally adjacent said opening and perpendicular to said walls,
each said floor section pivoting about a transverse axis between said operative and storage positions,
each said floor section when in said operative position defining a transverse bulk material carrier end wall, and when in said storage position being positioned over said opening,
a flexible liner mountable in said bulk compartment when said floor panel and said floor section are in said operative positions,
said flexible liner defining a liner compartment for holding bulk material when mounted in said bulk compartment,
said flexible liner including an inlet means for charging bulk materials into said liner compartment and an outlet means cooperable with said opening for communicating the interior of said liner compartment with the exterior of said bulk compartment.

36. The carrier unit according to claim 35 including, said transverse bulk material carrier end wall extending generally to the top of said vertical walls.

37. The carrier unit according to claim 35 including, a suspension means for suspending upper portions of said liner when said liner is mounted in said compartment,
said suspension means including a moving means for moving an end of said liner between said floor sections when in said operative position, and
said flexible liner including a first portion attached to said suspension means, a second portion positionable adjacent said first portion, and an attaching means for attaching said second portion to said first portion whereby said liner compartment is formed.

38. The carrier unit according to claim 35 including, each said floor panel pivoting about a longitudinal axis perpendicular to said transverse axis.

* * * * *